Oct. 26, 1948.  L. H. PETER  2,452,527
APPARATUS FOR EFFECTING AND CONTROLLING THE INFLATION
OF PNEUMATIC TIRES FOR VEHICLE WHEELS
Filed Jan. 5, 1945  2 Sheets-Sheet 2
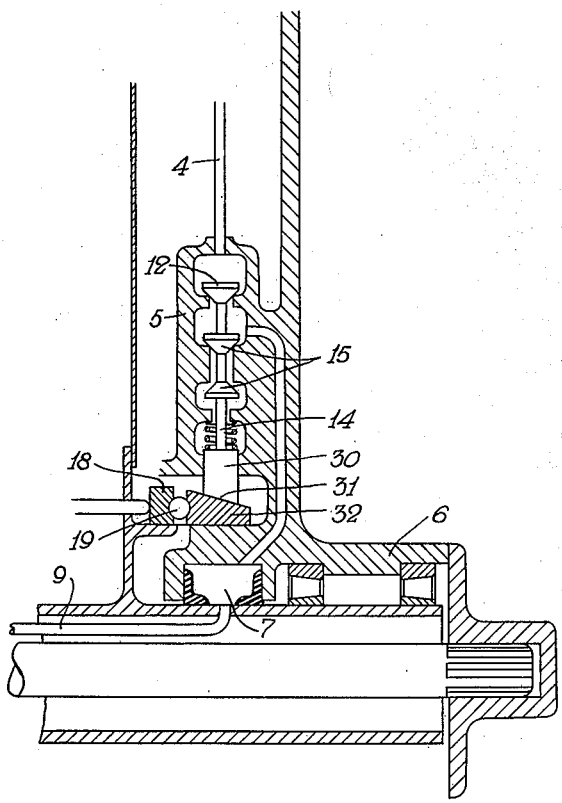
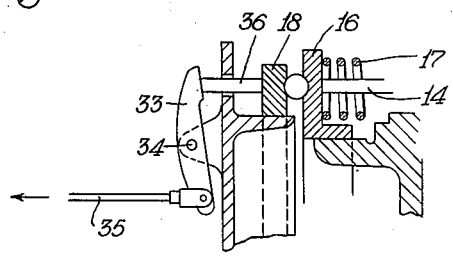
INVENTOR.
Leslie Hurst Peter
BY
ATTORNEY Patented Oct. 26, 1948

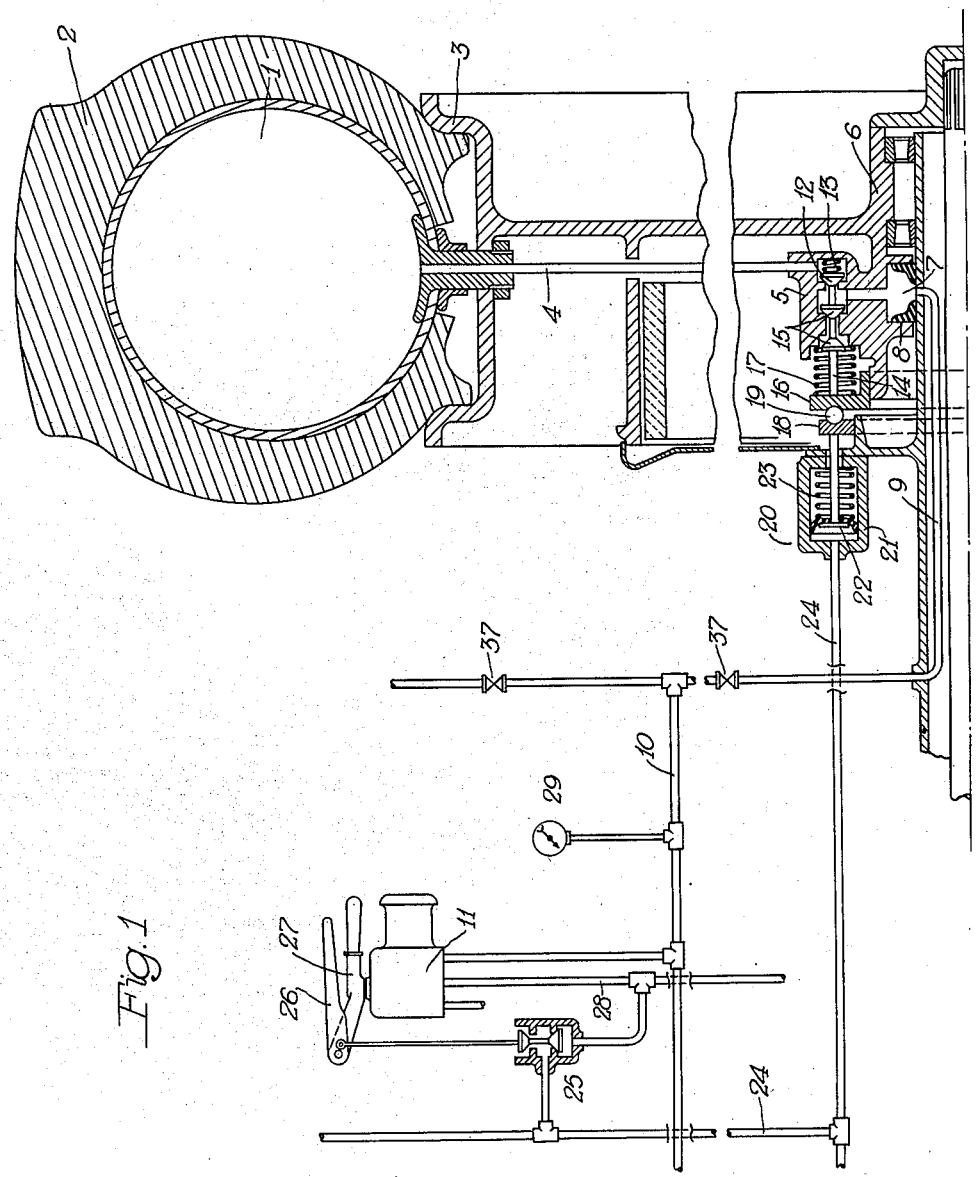

2,452,527

UNITED STATES PATENT OFFICE 2,452,527

APPARATUS FOR EFFECTING AND CONTROLLING THE INFLATION OF PNEUMATIC TIRES FOR VEHICLE WHEELS

Leslie Hurst Peter, London, England, assignor, by mesne assignments, to Westinghouse Air Brake Company, Pittsburgh, Pa., a corporation of Pennsylvania Application January 5, 1945, Serial No. 571,514
In Great Britain January 10, 1944

8 Claims. (Cl. 152—417)

This invention relates to apparatus for effecting and controlling the inflation of pneumatic tyres for vehicle wheels and has for its object to provide improved arrangements for this purpose.

In the case of certain vehicles the wheels of which are provided with pneumatic tyres it is desirable to increase or to decrease the degree of inflation or the pressure obtaining in each or all of the tyres and under certain conditions to effect this adjustment while the vehicle is in motion without risk of undue leakage.

It is, of course, possible to arrange for the supply of fluid under pressure such as compressed air to all the tires of the vehicle from a suitable source on the vehicle but this necessarily involves the provision of a gland or its equivalent to enable the supply of fluid under pressure to be effected or controlled while the vehicle wheels are rotating and considerable difficulty is encountered in preventing continuous leakage. Furthermore, a puncture in any of the tyres would with this arrangement cause deflation of all tyres while the provision of a non-return valve for each tyre for preventing this danger would evidently render it impossible to reduce the tyre pressure as is required under certain conditions of operation of the vehicle.

According to the present invention these disadvantages are overcome by providing arrangements for supplying all the tyres of the vehicle from a common source of fluid under pressure on the vehicle and controlling the pressure of the fluid thus supplied, a suitable non-return valve, mounted on each vehicle wheel and rotating therewith, being provided for the tyre together with mechanism controlled from the vehicle for rendering this valve temporarily inoperative when it is desired to vary the pressure in the tyre.

With this arrangement it will be seen that the leakage of air from the tyre during normal running when the tyre pressure is not being adjusted, is effectively prevented by the action of the non-return valve so that only during the relatively short periods of time, when the valve is rendered inoperative for tyre pressure adjustment is there any possibility of leakage of fluid from the tyre through the gland or its equivalent.

The mechanism for rendering the non-return valve temporarily inoperative may be actuated mechanically or by means of fluid under pressure and may be arranged to control the valve of each tyre individually or the valves of all the tyres of the vehicle simultaneously, as desired.

The pressure of the fluid in the tyres may be arranged to be adjusted by means of a control valve (preferably of the self-lapping type) mounted on the vehicle and under the control of the driver, the device for temporarily rendering the non-return valve of each tyre inoperative being arranged to be operated independently of the control valve or by the operation of this valve when adjustment of the tyre pressure is to be effected.

The invention is illustrated by way of example in the accompanying drawings of which Figure 1 is a view in sectional elevation partly diagrammatic of a pneumatic tyre provided with apparatus for controlling the inflation of the tyre in accordance with one form of the invention, Figures 2 and 3 being views similar to a portion of Figure 1 but illustrating modifications also embodying the invention.

Referring now to Figure 1 it will be seen that the pneumatic tyre illustrated comprises the usual inner tube 1 and outer cover 2 mounted on the flared rim 3 of a vehicle wheel.

A pipe 4 is provided extending radially from the interior of the inner tube 1 to a valve casing 5 mounted on the hub 6 of the wheel and rotating therewith, the casing 5 containing a supply chamber 7 communicating through a suitable gland 8 with a pipe 9 in the hub 6 and a supply pipe 10 leading to the supply port of a control or driver's valve 11 of the self-lapping type mounted at a convenient point on the vehicle.

The supply chamber 7 communicates through a suitable spring controlled non-return valve 12 with the radial pipe or passage, this valve being normally held closed under the action of its control spring 13. The non-return valve 12 is arranged to be opened by means of an operating stem 14 which is provided with sealing valve 15 to prevent fluid escaping to the external atmosphere from the supply chamber 7. Thus when the stem 14 is in its inner position the non-return valve 12 is permitted to remain closed. When the stem 14 is in its outer position the valve 12 is held open by the operating stem 14. The stem 14 projects outwards beyond the valve casing 5 and is arranged to be engaged by an annular driving member 16 mounted on the hub 6 of the wheel and adapted to slide thereon in a direction parallel to the axis of the wheel in such a manner that when moved in one direction the stem 14 is moved inwards to open the non-return valve 12.

This sliding movement of the driving member 16 is arranged to be effected against the opposing action of a control spring 17 by a stationary transmission ring 18 between which and the driving member 16 a suitable ball race 19 is interposed and the sliding movement of the transmission ring 18 for this purpose is effected by means of a fluid pressure actuated device 20.

The latter comprises a small cylinder 21 mounted on the vehicle frame or stationary portion of the wheel axle and containing a piston 22 mechanically coupled to the transmission ring 18. The piston 22 is provided with a control spring 23 normally maintaining the piston in its inner position as shown and fluid under pressure is arranged to be supplied to the cylinder 22 to operate the transmission ring 18 through a pipe 24 leading to an oppositely seating change-over valve 25 operated by a control handle 26 pivotally mounted on the handle 27 of the control valve 11. The oppositely seating valve 25 normally establishes communication between the cylinder 21 and the external atmosphere while when the valve 25 is operated by its handle 26 this communication is cut off and communication is established between a source of fluid under pressure such as the supply pipe 28 of the valve 11 and the pipe 24 leading to the cylinder.

The operation of this form apparatus is as follows:

Under normal running conditions, the inner tube 1 of the tyre having been inflated at the desired pressure, the non-return valve 12 remains closed and leakage of fluid from the tyre is thus prevented. Furthermore since the control valve 11 is in its normal or inoperative position as shown the pipe 9 leading to the supply chamber 7, is in open communication with the atmosphere through the valve 11 so that the gland 8 is not subjected to pressure.

When it is desired to vary the tyre pressure the handle of the control valve 11 is operated to establish the desired new pressure in the supply chamber 7, this pressure if desired being indicated by a suitable pressure gauge 29 on the pipe 10 leading through the pipe 9 to the supply chamber. The control handle 26 of the valve 25 for operating the transmission member 18 is now actuated so as to cause the non-return valve 12 of the tyre to be held open by the action of its operating stem 14 as above described so that communication is established between the supply chamber 7 and the inner tube 1 and the pressure in the tyre is thus caused to assume the new desired value. As soon as this is established the handle 26 of the valve 25 is released and the non-return valve 12 is thus allowed to resume its closed position.

In the modified apparatus shown in Figure 2 the valve casing 5 containing the non-return valve 12 and the sealing valves 15 are radially arranged and the valve stem 14 is provided with a head 30 having an inclined inner face 31 adapted to be engaged and moved radially by a coned driving member 32 which is operated through the ball race 19 by the transmission ring 18, the latter being arranged to be operated by the piston of the fluid pressure actuated device 20 as in the combination of Figure 1.

The operation of this form of the invention is similar to that of the form shown in Figure 1 and will be evident without further description.

Referring now to Figure 3 the arrangement therein illustrated is substantially the same as that of Figure 1 except that the transmission ring 18 in this case is arranged to be mechanically operated by a lever 33 pivotally mounted at 34 on a stationary part of the vehicle. One arm of the lever 33 is coupled through a rod 35 to a control handle such as that indicated at 26 in Figure 1 or mounted at any suitable point on the vehicle, the other arm of the lever 33 being arranged to operate the ring 18 through a thrust member or rod 36.

The operation of this form of the invention is substantially the same as that of the apparatus of Figure 1 and will be readily understood without detailed description.

The control valve 11 or the control mechanism 33, 35, 36 or the valve 25 for actuating the transmission ring 18 may if desired, be arranged to control the action above described for each tyre separately or for all or some of the tyres on the vehicle wheels as a whole. In the latter case suitable cocks may be provided as indicated at 37 in Figure 1 for enabling each tyre to be isolated in the event of puncture and the various pipe connections may be constituted wholly or partly by flexible hose couplings so as to permit relative movement due to the springing of the vehicle.

In these and other respects the invention is evidently not limited to the particular constructions above described and illustrated by way of example.

Having now described my invention, what I claim as new and desire to secure by Letters Patent is:

1. The combination with a vehicle wheel having a pneumatic tyre, of valve means mounted on said wheel for controlling the pressure of fluid in said tyre, said valve means comprising a casing having one chamber in constant open communication with said tyre, another chamber in which the pressure of fluid may be varied, and a valve member mounted in said casing for controlling communication between said chambers, said valve member having a normal position in which communication between said chambers is closed and being operable to another position in which communication between said chambers is open, means for operating said valve means comprising a ring member mounted on said wheel being rotatable with said wheel and being shiftable relative to the wheel for effecting the movement of said valve member, and means mounted on a non-rotatable part of the vehicle operative to effect the operation of said ring member.

2. The combination with a vehicle wheel having a hub and a pneumatic tyre, of valve means mounted on said hub for controlling the pressure of fluid in said tyre, said valve means comprising a casing having one chamber in constant open communication with said tyre, another chamber in which the pressure of fluid may be varied, and a valve member mounted in said casing operative to control communication between said chambers, said valve member having a normal position in which communication between said chambers is closed and being operable to a different position in which communication between said chambers is open, and means for effecting the operation of said valve means comprising a driving ring member adjacent said valve member mounted about said hub for rotation therewith and for sliding movement thereon, a ring mounted in coaxial relationship with said driving member and said hub on a non-rotative part of the vehicle for sliding movement thereon, and rotatable bearing means interposed between and operatively engaging said driving member and said ring.

3. The combination with a vehicle wheel having a hub and a pneumatic tyre, of valve means mounted on said hub for controlling the pressure of fluid in said tyre, said valve means comprising a casing having one chamber in constant open communication with said tyre, another chamber in which the pressure of fluid may be varied, and a valve member mounted in said casing operative to control communication between said chambers, said valve member having a normal position in which communication between said chambers is closed and being operable to a different position in which communication between said chambers is open, means for effecting the operation of said valve means comprising a ring member encircling said hub and arranged for rotation therewith and being capable of sliding relative to said hub for effecting the operation of said valve member, non-rotatable means for effecting the sliding movement of said ring member, and means remote from said valve means for effecting the operation of said non-rotatable means and for varying the pressure of fluid in said other chamber in said valve means.

4. The combination with a vehicle wheel having a hub and a pneumatic tyre, of a valve device mounted on said hub for controlling the pressure of fluid in said tyre, said valve device comprising a casing having one chamber in constant open communication with said tyre, another chamber in which the pressure of fluid may be varied, and a valve member mounted in said casing operative to control communication between said chambers, said valve member having a normal position in which communication between said chambers is closed and being operable to a different position in which communication between said chambers is open, means for effecting the operation of said valve device comprising a ring member carried around said hub adjacent said valve device and arranged to be shifted relative to said hub for effecting the operation of said valve member and for rotation with said hub, non-rotatable means operative to effect the shifting action of said ring member and means for varying the pressure of fluid in said other chamber in said valve device.

5. In a system for controlling the pressure of fluid in the tyres of a vehicle while the vehicle wheels are rotating, a valve device arranged to be mounted on each wheel of the vehicle comprising a casing having a conduit communicating with the associated tyre and also having a fluid pressure supply passage formed therein, valve means operative to admit fluid under pressure to said conduit and to release fluid under pressure from the conduit, said valve means having a normal position in which said passage is isolated from said conduit and an operative position in which said passage is open to said conduit, a spring urging said valve means toward its normal position, a ring member carried around said hub adjacent said valve device and arranged to be shifted axially relative to said hub for effecting the operation of said valve means against the pressure of said spring and for rotation with said hub, non-rotative means operative to effect the shifting action of said ring member, and means for varying the pressure of fluid in said passage.

6. The combination with a vehicle wheel having a hub and a pneumatic tyre, a valve means mounted on said hub for controlling the pressure of fluid in said tyre, said valve means comprising a casing having one chamber in constant open communication with said tyre, another chamber in which the pressure of fluid may be varied, and a valve member mounted in said casing for controlling communication between said chambers, said valve member having a normal position in which communication between said chambers is closed and being operable to another position in which communication between said chambers is open, means for effecting the operation of said valve means; a driving ring member mounted about said hub for rotation with and for shifting in an axial direction relative to said hub to effect the operation of said valve member, fluid pressure responsive means mounted on a non-rotative part of the vehicle for effecting the operation of said ring member, valve means remote from said wheel for controlling the pressure of fluid in said other chamber and valve means for controlling the pressure of fluid admitted to said fluid pressure responsive means.

7. The combination with a vehicle wheel having a pneumatic tyre, of valve means mounted on said wheel for controlling the pressure of fluid in said tyre, said valve means comprising a casing having one chamber in constant open communication with said tyre, another chamber in which the pressure of fluid may be varied, and a valve member mounted in said casing for controlling communication between said chambers, said valve member having a normal position in which communication between said chambers is closed and being operable to another position in which communication between said chambers is open, means for operating said valve means comprising a coned driving member slidably mounted on said hub and being rotatable therewith, and means mounted on a non-rotatable part of the vehicle for actuating said coned driving member slidably mounted on said hub and being rotatable therewith, and means mounted on a non-rotatable part of the vehicle for actuating said coned driving member.

8. The combination with a vehicle wheel having a hub and a pneumatic tyre, of valve means mounted on said hub for controlling the pressure of fluid in said tyre, said valve means comprising a casing having one chamber in constant open communication with said tyre, another chamber in which the pressure of fluid may be varied, and a valve member mounted in said casing for controlling communication between said chambers, said valve member having a normal position in which communication between said chambers is closed and being operable to another position in which communication between said chambers is open, means for effecting the operation of said valve means, a driving ring member mounted about said hub for rotation with and for shifting in an axial direction relative to said hub to effect the operation of said valve member, and means including a lever rockably mounted on a non-rotatable part of the vehicle operative to effect the operation of the ring member.

LESLIE HURST PETER.

REFERENCES CITED

The following references are of record in the file of this patent:

UNITED STATES PATENTS

| Number | Name | Date |
|---|---|---|
| 2,012,773 | Rockman | Aug. 27, 1935 |

FOREIGN PATENTS

| Number | Country | Date |
|---|---|---|
| 470,080 | Great Britain | 1937 |